US007593962B2

(12) United States Patent
Beale et al.

(10) Patent No.: US 7,593,962 B2
(45) Date of Patent: Sep. 22, 2009

(54) SYSTEM AND METHOD FOR DYNAMICALLY CREATING RECORDS

(75) Inventors: Kevin M. Beale, Stoughton, WI (US); Thomas V. Curtin, Madison, WI (US); Wayne P. Waldner, Richland Center, WI (US); William J. Curtin, IV, Madison, WI (US)

(73) Assignee: American Tel-A-Systems, Inc., McFarland, WI (US)

( * ) Notice: Subject to any disclaimer, the term of this patent is extended or adjusted under 35 U.S.C. 154(b) by 282 days.

(21) Appl. No.: 11/062,229

(22) Filed: Feb. 18, 2005

(65) Prior Publication Data

US 2006/0190422 A1 Aug. 24, 2006

(51) Int. Cl.
*G06F 7/00* (2006.01)
(52) U.S. Cl. .................. 707/104.1; 707/1; 707/102; 379/265.09
(58) Field of Classification Search .................. 707/1–4, 707/100–102, 104.1; 379/88.17, 265.09, 379/265.03, 265.02
See application file for complete search history.

(56) References Cited

U.S. PATENT DOCUMENTS

| 5,131,184 | A | * | 7/1992 | Harrison ..................... 43/100 |
|---|---|---|---|---|
| 5,479,487 | A | | 12/1995 | Hammond ................... 379/67 |
| 5,754,636 | A | | 5/1998 | Bayless et al. ............... 379/142 |
| 5,802,526 | A | | 9/1998 | Fawcett et al. ............... 707/104 |
| 5,884,032 | A | | 3/1999 | Bateman et al. ........ 395/200.34 |
| 5,946,381 | A | | 8/1999 | Danne et al. ................. 379/142 |
| 5,946,386 | A | | 8/1999 | Rogers et al. ............... 379/265 |
| 5,946,485 | A | * | 8/1999 | Weeren et al. .............. 717/109 |
| 5,987,116 | A | * | 11/1999 | Petrunka et al. ........ 379/265.13 |
| 6,014,379 | A | | 1/2000 | White et al. ................ 370/389 |
| 6,070,142 | A | | 5/2000 | McDonough et al. .......... 705/7 |
| 6,091,810 | A | | 7/2000 | Shaffer et al. ............... 379/220 |
| 6,131,184 | A | * | 10/2000 | Weeren et al. .............. 717/109 |
| 6,141,413 | A | | 10/2000 | Waldner et al. ............. 379/265 |

(Continued)

OTHER PUBLICATIONS

"An Approach to Internet-Based Virtual Call Center Implementation"—M. Popovic & V. Kovacevic—lecture Notes in Computer Science—Springer Berlin / Heidelberg—Jan. 1, 2001 (pp. 75-84).*

(Continued)

*Primary Examiner*—Shahid A Alam
*Assistant Examiner*—Anh Ly
(74) *Attorney, Agent, or Firm*—Baker Botts L.L.P.

(57) ABSTRACT

A communication system that is capable of collecting information from one or more users of the communication system includes one or more data collection mechanisms that are operated by a first entity. The mechanisms operate to collect at least a portion of information from a user of a communication system on behalf of a second entity that is different than the first entity. The system also includes one or more memory modules that are coupled to the one or more data collection mechanisms and that are operable to store one or more records on behalf of the second entity. Each of the one or more records comprises information that is associated with a client of the second entity. At least one of the one or more records comprises at least a portion of the information collected from the user of the communication system. In one particular embodiment, the one or more records are controlled by the first entity.

40 Claims, 7 Drawing Sheets

U.S. PATENT DOCUMENTS

| | | | |
|---|---|---|---|
| 6,168,562 B1* | 1/2001 | Miller et al. | 600/300 |
| 6,188,762 B1 | 2/2001 | Shooster | 379/265 |
| 6,212,178 B1 | 4/2001 | Beck et al. | 370/352 |
| 6,222,920 B1* | 4/2001 | Walker et al. | 379/266.01 |
| 6,356,633 B1 | 3/2002 | Armstrong | 379/265.11 |
| 6,385,646 B1* | 5/2002 | Brown et al. | 709/217 |
| 6,393,423 B1* | 5/2002 | Goedken | 707/10 |
| 6,411,686 B1* | 6/2002 | Porter et al. | 379/88.18 |
| 6,421,427 B1* | 7/2002 | Hill et al. | 379/88.14 |
| 6,430,285 B1* | 8/2002 | Bauer et al. | 379/265.01 |
| 6,456,699 B1* | 9/2002 | Burg et al. | 379/88.17 |
| 6,463,149 B1* | 10/2002 | Jolissaint et al. | 379/265.09 |
| 6,480,601 B1* | 11/2002 | McLaughlin | 379/265.11 |
| 6,499,013 B1 | 12/2002 | Weber | 704/257 |
| 6,504,914 B1* | 1/2003 | Brademann et al. | 379/88.16 |
| 6,510,220 B1* | 1/2003 | Beckett et al. | 379/265.06 |
| 6,522,743 B1 | 2/2003 | Hurd | 379/266.04 |
| 6,529,597 B1 | 3/2003 | Barrett | 379/265.02 |
| 6,529,724 B1 | 3/2003 | Khazaka et al. | 455/405 |
| 6,574,630 B1* | 6/2003 | Augustine et al. | 707/10 |
| 6,587,556 B1* | 7/2003 | Judkins et al. | 379/219 |
| 6,597,783 B1 | 7/2003 | Tada et al. | 379/265.09 |
| 6,600,736 B1* | 7/2003 | Ball et al. | 370/352 |
| 6,603,854 B1* | 8/2003 | Judkins et al. | 379/265.06 |
| 6,604,075 B1* | 8/2003 | Brown et al. | 704/270.1 |
| 6,614,895 B1 | 9/2003 | Impey et al. | 379/127.01 |
| 6,654,447 B1* | 11/2003 | Dewan | 379/76 |
| 6,697,858 B1 | 2/2004 | Ezerzer et al. | 709/224 |
| 6,701,366 B1* | 3/2004 | Kallas et al. | 709/227 |
| 6,704,396 B2* | 3/2004 | Parolkar et al. | 379/88.17 |
| 6,718,023 B1 | 4/2004 | Zolotov | 379/133 |
| 6,731,730 B1 | 5/2004 | Zolotov | 379/126 |
| 6,760,727 B1* | 7/2004 | Schroeder et al. | 707/10 |
| 6,778,653 B1* | 8/2004 | Kallas et al. | 379/201.01 |
| 6,801,604 B2* | 10/2004 | Maes et al. | 379/88.17 |
| 6,829,348 B1 | 12/2004 | Schroeder et al. | 379/265.09 |
| 6,870,913 B2* | 3/2005 | Narasimhan et al. | 379/106.02 |
| 7,140,004 B1* | 11/2006 | Kunins et al. | 379/88.16 |
| 7,359,918 B2* | 4/2008 | Crapp et al. | 707/104.1 |
| 2001/0012356 A1 | 8/2001 | McDuff et al. | 379/265.02 |
| 2001/0056422 A1* | 12/2001 | Benedict et al. | 707/10 |
| 2002/0055967 A1* | 5/2002 | Coussement | 709/202 |
| 2002/0067816 A1 | 6/2002 | Bushnell | 379/201.02 |
| 2002/0073207 A1 | 6/2002 | Widger et al. | 709/227 |
| 2002/0076031 A1 | 6/2002 | Falcon et al. | 379/265.11 |
| 2002/0090964 A1 | 7/2002 | Harder | 455/466 |
| 2002/0101979 A1 | 8/2002 | Borodow et al. | 379/265.02 |
| 2002/0156797 A1 | 10/2002 | Lee et al. | 707/200 |
| 2002/0172335 A1* | 11/2002 | Narasimhan et al. | 379/106.02 |
| 2002/0196922 A1 | 12/2002 | Marwell et al. | 379/218.01 |
| 2003/0002651 A1* | 1/2003 | Shires | 379/265.01 |
| 2003/0037112 A1 | 2/2003 | Fitzpatrick et al. | 709/205 |
| 2003/0086554 A1 | 5/2003 | Krimstock et al. | 379/265.02 |
| 2003/0092976 A1* | 5/2003 | Murase et al. | 600/300 |
| 2003/0108183 A1* | 6/2003 | Dhir et al. | 379/265.01 |
| 2003/0125987 A1 | 7/2003 | Rucker | 705/3 |
| 2003/0142809 A1 | 7/2003 | Coffey | 379/265.01 |
| 2003/0145054 A1* | 7/2003 | Dyke | 709/205 |
| 2003/0148790 A1 | 8/2003 | Pappalardo et al. | 455/558 |
| 2003/0161448 A1* | 8/2003 | Parolkar et al. | 379/88.17 |
| 2003/0179876 A1* | 9/2003 | Fox et al. | 379/265.02 |
| 2003/0185382 A1 | 10/2003 | Zama | 379/265.13 |
| 2003/0212558 A1* | 11/2003 | Matula | 704/260 |
| 2003/0225618 A1* | 12/2003 | Hessburg et al. | 705/14 |
| 2004/0022383 A1 | 2/2004 | Duncan et al. | 379/265.01 |
| 2004/0062373 A1 | 4/2004 | Baker | 379/218.01 |
| 2004/0062380 A1 | 4/2004 | Delaney | 379/265.02 |
| 2004/0083479 A1* | 4/2004 | Bondarenko et al. | 719/310 |
| 2004/0117383 A1 | 6/2004 | Lee et al. | 707/100 |
| 2004/0120316 A1* | 6/2004 | McCormack et al. | 370/392 |
| 2004/0125937 A1 | 7/2004 | Turcan et al. | 379/265.02 |
| 2004/0125940 A1 | 7/2004 | Turcan et al. | 379/265.13 |
| 2004/0161078 A1* | 8/2004 | Knott et al. | 379/88.01 |
| 2004/0170263 A1 | 9/2004 | Michael et al. | 379/201.1 |
| 2004/0176973 A1 | 9/2004 | Lapeze et al. | 705/1 |
| 2004/0179672 A1 | 9/2004 | Pagel et al. | 379/266.1 |
| 2004/0185825 A1* | 9/2004 | Preiss et al. | 455/405 |
| 2004/0196966 A1 | 10/2004 | Bushnell | 379/88.19 |
| 2004/0199387 A1* | 10/2004 | Wang et al. | 707/6 |
| 2004/0217986 A1* | 11/2004 | Hambleton et al. | 345/763 |
| 2004/0240655 A1 | 12/2004 | Swick | 379/218.01 |
| 2005/0002502 A1* | 1/2005 | Cloran | 379/88.18 |
| 2005/0055216 A1* | 3/2005 | Bushey et al. | 704/277 |
| 2005/0071360 A1* | 3/2005 | Crapp et al. | 707/102 |
| 2005/0123124 A1* | 6/2005 | Collins | 379/265.09 |
| 2005/0135595 A1* | 6/2005 | Bushey et al. | 379/265.01 |
| 2005/0154648 A1* | 7/2005 | Strause | 705/26 |
| 2005/0286688 A1* | 12/2005 | Scherer | 379/88.21 |
| 2006/0123331 A1* | 6/2006 | Hightower et al. | 715/505 |
| 2006/0126803 A1* | 6/2006 | Patel et al. | 379/88.01 |
| 2006/0136914 A1* | 6/2006 | Marascio et al. | 718/100 |
| 2006/0165104 A1* | 7/2006 | Kaye | 370/401 |
| 2006/0190422 A1* | 8/2006 | Beale et al. | 707/1 |
| 2006/0190424 A1* | 8/2006 | Beale et al. | 707/2 |
| 2006/0190561 A1* | 8/2006 | Conboy et al. | 709/217 |
| 2006/0242598 A1* | 10/2006 | Marascio et al. | 379/93.17 |
| 2006/0253435 A1* | 11/2006 | Nishizawa et al. | 707/3 |
| 2007/0291924 A1* | 12/2007 | Matula | 379/265.09 |

OTHER PUBLICATIONS

"Assessing Web-enabled Call Center Technologies"—Bernett, H. & Jaramillo, M.L.—IT Professional—May/Jun. 2001, vol. 3, Issue: 3 (pp. 24-30).*

* cited by examiner

302a — Q: Welcome to ABC Computer and Software Company's Ordering and Help Line. Please respond to the following questions by speaking your response. At any time during the call you can request to speak with an agent by either pressing "0" followed by the "#" key or by saying "operator". Are you a previous customer of ABC Co.?

304a — A: Yes

302b — Q: What is your first and last name?

304b — A: Frank Smith

302c — Q: Is your telephone number still 214-234-5678?

304c — A: Yes

302d — Q: Is your billing address still 698 Lucky Road, Dallas Texas, 75030?

304d — A: No

302e — Q: What is your current address?

304e — A: 972 Fielding Street, Dallas Texas, 75951

*FIG. 3A*

342a — Q: Would you like to purchase the 120 Gb memory?

344a — A: Yes.

342b — Q: Mr. Smith, would you like the 120 Gb hard-drive shipped to your billing address?

344b — A: Yes.

342c — Q: Mr. Smith, how would you like to pay for the new hard-drive?

344c — A: Credit Card.

342d — Q: What type of credit card would you like to use?

344d — A: Visa.

342e — Q: What is the credit card number?

344e — A: 0000 0000 1234 5678

342f — Q: What is the expiration date?

344f — A: 01/06

342g — Q: Mr. Smith, can I assist you with anything else today?

344g — A: No.

342h — Q: Thank you for your purchase. A charge of $149.99 will be posted on credit card 0000 0000 1234 5678 and your new hard-drive should by mailed to you within seven business days.

340

Order Form: 346

Billing Information:

Name: Frank Smith
Address: 972 Fielding St.
City: Dallas  State: TX  Zip: 75951
Payment Type: Visa
Card Number: 0000 0000 1234 5678
Expiration: 01/06

Shipping Information:

Name: Frank Smith
Address: 972 Fielding St.
City: Dallas  State: TX  Zip: 75951

Order Information:

Item: 102 Gb HD for ABC 64
Cost: $149.99

*FIG. 3D*

452a Q: Mr. Jones, how may I assist you today?

454a A: I would like information concerning GenX's ability to supply pharmaceuticals to my region.

452b Q: Mr. Jones, I will have a brochure of all the products and services that GenX provides mailed to your address for you to review. Would that be ok to you?

454b A: Yes.

452c Q: Mr. Jones, let me also provide to your a contact number for our south east sales representative Mrs. Jennifer James, who will be able to further assist you with any additional information that you may need. Do you have a pen and paper?

454c A: Yes, go ahead

452d Q: Mrs. Jennifer James contact number is (813)-524-1234. Would it be ok to have Mrs. James contact you in about a week or so to see if you have any additional questions?

454d A: Yes, that would be fine.

452e Q: Mr. Jones, can I help you with anything else today?

454e A: No.

452f Q: Mr. Jones, thank you for calling GenX Pharmaceuticals.

SALES REPRESENTATIVES
- Southeastern U.S.
  - Jennifer James
    (813)-524-1234
- Northeastern U.S.
  - Frank Adams
  ·
  ·
  ·
- Western U.S.

SYSTEM AND METHOD FOR DYNAMICALLY CREATING RECORDS

TECHNICAL FIELD OF THE INVENTION

This invention relates in general to the field of information collection systems and more particularly to a system and method for dynamically creating records.

BACKGROUND

Data collection mechanisms often operate to collect information from one or more users of the data collection mechanism. The data collection mechanisms typically employ one or more programs that guide the collection of information from a user. Conventional data collection mechanisms may, in some cases, require an operator or user of the data collection mechanism to manually access other programs or information sources to complete the information collection process.

SUMMARY OF EXAMPLE EMBODIMENTS

In one embodiment, a communication system capable of collecting information from one or more users of the communication system comprises one or more data collection mechanisms operated by a first entity. The data collection mechanisms are operable to collect at least a portion of information from a user of a communication system on behalf of a second entity that is different than the first entity. The system also comprises one or more memory modules that are coupled to the one or more data collection mechanisms and that are operable to store one or more records on behalf of the second entity. Each of the one or more records comprises information that is associated with a client of the second entity. At least one of the records comprises at least a portion of the information collected from the user of the communication system. In one particular embodiment, the one or more records are controlled by the first entity.

In one example of a method for providing information collection from a user at a data collection mechanism comprises, the method comprises collecting at least a portion of information from a user of a communication system on behalf of a first entity using a data collection mechanism operated by a second entity. In this particular embodiment, the first entity comprises an entity that is different than the second entity. The method also comprises storing one or more records on behalf of the first entity. Each of the one or more records comprises information that is associated with a client of the first entity. At least one of the records comprises at least a portion of the information collected from the user of the communication system. In one particular embodiment, the one or more records are controlled by the second entity.

In another example of a method for providing information collection from a user at a data collection mechanism comprises, the method comprises collecting information from a plurality of users of a communication system on behalf of a first entity using one or more data collection mechanisms operated by a second entity. The method also comprises storing at least a portion of the information collected from each of the plurality of users in a contact management database on behalf of the first entity. The contact management database being controlled by the second entity. In one particular embodiment, the contact management database is electronically searchable.

Depending on the specific features implemented, particular embodiments of the present invention may exhibit some, none, or all of the following technical advantages. For example, various embodiments may be capable of dynamically linking to an information source and/or a program during an information collection process. Some embodiments may be capable of improving the efficiency of a user or agent of a data collection mechanism.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which:

FIGS. 3A through 3D are illustrative examples of queries associated with scripts capable of being used by a data collection mechanism;

FIGS. 4a-4b are illustrative examples of queries associated with scripts capable of being used by a data collection mechanism.

DETAILED DESCRIPTION OF EXAMPLE EMBODIMENTS

Figure 1:
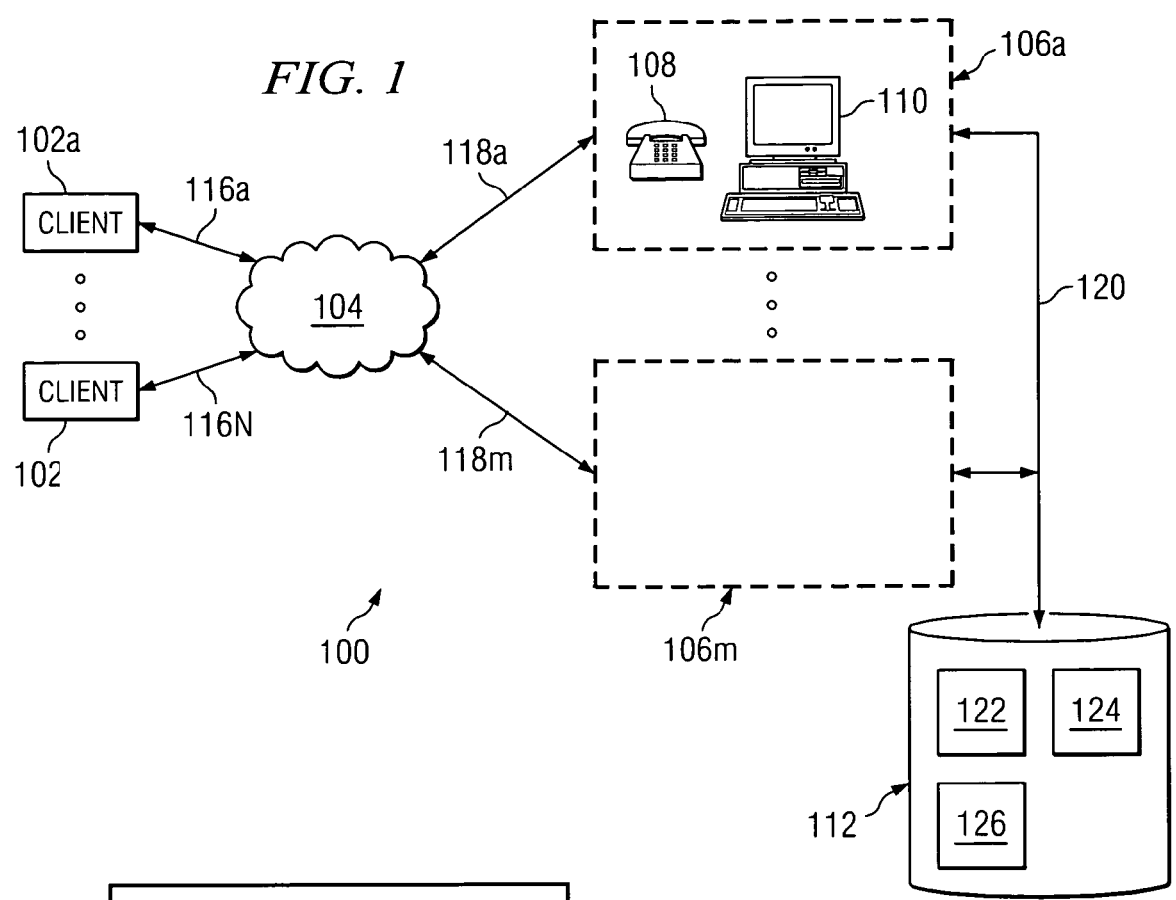
FIG. 1 is a block diagram of one embodiment of a communication system capable of collecting information from one or more users of the system.

FIG. 1 is a block diagram of one embodiment of a communication system 100 capable of collecting information from one or more users of system 100. FIG. 1 illustrates just one example embodiment of system 100. In various embodiments, system 100 can comprise a network or communication system for use by an entity, such as, for example, a call center, a hospital, or other business entity. It should be appreciated that other embodiments of system 100 may be used without departing from the scope of the present disclosure.

In this example, system 100 includes one or more data collection mechanisms 106 capable of performing a desired communicating and/or computing functionality. As non-limiting examples, mechanism 106 could comprise an interactive voice response system (IVR), an interactive web-based system, an agent-based system, or a combination of these or other information communication systems. In particular embodiments, data collection mechanism 106 may include one or more software and/or firmware modules. In various embodiments, data collection mechanism 106 could comprise, for example, one or more software engines, one or more memory modules, and/or one or more speech recognition modules capable of processing voice responses, text-to-speech translations, and/or speech-to-text translations.

In one particular embodiment, data collection mechanisms 106 receive and/or communicate information through a network 104 coupled to data collection mechanisms 106. As used throughout this document, the term "couple" and/or "coupled" refers to any direct or indirect communication between two or more elements, whether or not those elements are in physical contact with one another. In this example, data collection mechanisms 106 couple to network 104 through one or more communications links 118. In other embodiments, data collection mechanisms 106 operate to collect, store, and/or communicate information to and/or from network 104.

Network 104 may comprise any wireless network, wireline network, or combination of wireless and wireline networks capable of supporting communication between network elements using ground-based and/or space-based components. For example, network 104 may comprise a information network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations.

One or more clients 102a-102n may couple to network 104 through one or more communications links 116. Each client 102 may include any computing and/or communication device capable of enabling the communication of information to and/or from one or more data collection mechanisms 106 over network 104. In some embodiments, clients 102a-102n enable a user of system 100 to communicate and/or receive information to and/or from one or more of data collection mechanisms 106. Each client 102 may include, for example, a telephone, a wireless device, a voice over IP device, a desktop computer, a laptop computer, a personal digital assistant, a workstation, a mainframe computer, a mini-frame computer, a web server, or any other computing and/or communicating device.

Although this example shows clients 102 communicating with data collection mechanism 106 over network 104, in other embodiments, some or all clients 102 could alternatively, or in addition, communicate with data collection mechanisms 106 using direct links.

System 100 also includes a memory module 112 capable of storing one or more scripts 122. As used throughout this document, the term "script" refers to functionality that is capable of facilitating the presentation of one or more queries to collect information from one or more clients or users of system 100. In one particular non-limiting example, script 122 comprises a series of queries requesting information from a user of data collection mechanism 106. In some cases, scripts 122 may include, for example, an IVR script, an HTML-based script, an XML-based script, or a combination of these or other scripting formats. Scripts 122 may comprise, for example, software, firmware, code, portions of code, information compilations, and/or a combination of these or any other type of information.

In this particular embodiment, memory module 112 also stores one or more applications 124 and/or information sources 126. Application 124 can comprise, for example, a program, a web-page, a phone related activity, and/or any other appropriate utility. Moreover, information source 126 can comprise, for example, a database, a directory, an InfoPage, or any collection of information. In other embodiments, memory module 112 may be capable of storing, for example, one or more functions and/or other information.

Memory module 112 may include any hardware, software, firmware, or combination thereof operable to store and facilitate retrieval of information. Memory module 112 may store information using any of a variety of information structures, arrangements, and/or compilations. Memory module 112 may, for example, include a dynamic random access memory (DRAM), a static random access memory (SRAM), a NAND flash memory, or any other suitable volatile or nonvolatile storage and retrieval device or combination of devices.

Although this example depicts memory module 112 as a single medium, memory module 112 may comprise any additional number of storage media without departing from the scope of the present disclosure. Additionally, all or part of memory module 112 could reside locally within one or more information exchange mechanisms 106 or could reside in a location remote from and accessible to one or more information exchange mechanisms 106.

In some embodiments, data collection mechanisms 106 may be capable of accessing, retrieving, and/or executing one or more scripts 122, one or more applications 124, and/or information sources 126 stored on memory module 112. In other embodiments, data collection mechanisms 106 may be capable of updating, creating, editing, and/or storing information sources 126 on memory module 112. Data collection mechanisms 106 can access memory module 112 through, for example, communications link 120 or through network 104 (not explicitly shown).

In one particular embodiment, data collection mechanism 106a comprises a live agent-based information collection system capable of collecting information from clients 102 and/or from users of system 100. Although mechanism 106a is an agent-based system in this example, any information collection system may be used without departing from the scope of the present disclosure. In this example, data collection mechanism 106a includes a communication device 108 that enables an agent to communicate with client 102. Communication device 108 may comprise, for example, a telephone, a wireless device, a voice over IP device, a personal computer, or any other computing and/or communicating device or combination of devices.

In this example, data collection mechanism 106a also includes a host 110 capable of accessing, retrieving, executing, displaying, editing, creating, and/or storing one or more scripts 122, applications 124, and/or information sources 126 that at least partially contribute to the collection of information from a client 102 and/or a user of system 100. Host 110 may include a graphical user interface (GUI) that enables a live agent to collect, enter, process, store, retrieve, amend, and/or dispatch information during the interaction of data collection mechanism 106a with client 102 and/or a user of system 100. Host 110 may comprise, for example, a desktop computer, a laptop computer, a server computer, a personal digital assistant, and/or any other computing or communicating device or combination of devices. Although this example depicts host 110 and communication device 108 as separate devices, one device that is capable of performing the desired functionality could be used without departing from the scope of the present disclosure. Moreover, there is no requirement that each of communication device 108 and host 110 resides locally within mechanism 106a as shown in this example.

In the illustrated embodiment, system 100 includes at least a first communications link 116 and a second communications link 118 operable to facilitate the communication of information to and/or from network 104. System 100 also includes a third communications link 120 operable to facilitate the communication of information between data collection mechanism 106 and memory module 112. Communications links 116, 118, and 120 may include any hardware, software, firmware, or combination thereof. In various embodiments, communications links 116, 118, and 120 may comprise communications media capable of assisting in the communication of analog and/or digital signals. Communications links 116, 118, and 120 may, for example, comprise a twisted-pair copper telephone line, a fiber optic line, a Digital Subscriber Line (DSL), a wireless link, a USB bus, a PCI bus, an ethernet interface, or any other suitable interface and/or medium operable to assist in the communication of information to and/or from network 104.

In this particular embodiment, a user of client 102 initiates the information collection process by using a computing and/or communication device, such as a telephone, to connect to data collection mechanisms 106. In other embodiments, one of data collection mechanisms 106 could initiate the information collection process with client 102. In some embodiments, a user of data collection mechanism 106 could initiate the information collection process with system 100. In this example, after initiation of the process, data collection mechanism 106a operates to collect information from the user of client 102 using host 110, communication device 114, and script 122. Although data collection mechanism 106a is used in this example, any of data collection mechanisms 106a-106m could be used without departing from the scope of the present disclosure. In this particular embodiment, host 110 executes an XML-based script that enables an agent using data collection mechanism 106a to interact with and collect information from client 102. In other embodiments, the script executed by host 110 may comprise, for example, an IVR-based script, an HTML-based script, a VML-based script, or a combination of these or other scripting formats.

Data collection mechanism 106a interacts with the user of client 102 by requesting that the user of client 102 respond to a series of queries associated with the script. In some embodiments, the user of client 102 can respond by keying digits on a touch-tone keypad, a keyboard, a microphone, and/or any other device capable of receiving a response that is comprehensible to client 102. In this particular embodiment, the user of client 102 responds to each of the series of queries by "speaking" a response to each query associated with the script.

In this particular embodiment, an agent using data collection mechanism 106a receives the spoken responses for each of the queries associated with the XML-based script and inputs the spoken response into host 110. An agent can input the spoken responses into host 110 by, for example, typing the response into a displayed field, selecting an appropriate response from a pull down menu, by clicking an appropriate check-box displayed, or by any other appropriate method. Although an agent receives and inputs the responses to the queries in this example, data collection mechanisms 106 could alternatively receive and input the responses without involving a live agent. For example, if data collection mechanism 106a comprises a speech recognition module capable of processing voice responses, then data collection mechanism 106 could automatically receive and input the responses without involving the agent.

In this particular embodiment, the XML-based script executed and displayed on host 110 includes one or more dynamic links. In other embodiments, one or more dynamic links may be included in, for example, an IVR-based script, an HTML-based script, a VML-based script, or a combination of these or other scripting formats. As used throughout this document, the term "dynamic link" refers to an item or element within a script that automatically initiates the performance of one or more functions in response to a triggering event. The one or more functions may comprise, for example, accessing, executing, retrieving, amending, and/or updating one or more information sources 126, one or more applications 124, and/or any other appropriate utilities. In various embodiments, the one or more functions automatically initiated in response to the triggering event may reside locally within one or more information exchange mechanisms 106 or could reside in a location remote from and accessible to information exchange mechanisms 106.

The triggering event that results in the automatic initiation of one or more functions may comprise any criterion or combination of criteria that is related to the information received in response to script 122 being executed on data collection mechanism 106. In some cases, the triggering event can be related to one or more actions performed by the live agent using data collection mechanism 106a. For example, the triggering event may comprise the live agent entering one or more words into a field or message screen, selecting one or more options from a pull-down menu, performing a series of key strokes, or a combination of these or other criteria. In other cases, the triggering event can be related to one or more responses processed by an IVR-based data collection mechanism 106 that is capable of processing voice responses, text-to-speech translations, and/or speech-to-text translations. For example, the triggering event can comprise a particular word or group of words that have been converted using a speech-to-text translation. In some embodiments, the triggering event may be related to the automatic collection of, for example, Automatic Number Identifier (ANI) information, Caller Identification information, Caller Name, alarm interfaces, and other information interfaces that are not operator or live agent based. Moreover, a triggering event is not a specific request by the live agent or user for the function to be initiated. That is, a triggering event is not a specific request by the live agent or user for information from the information source, or to launch a particular application, or other utility.

In this particular embodiment, the function automatically initiated by the dynamic link is launched by and/or displayed on host 110. Automatically launching and/or displaying the function initiated by the dynamic link can advantageously assist the live agent during the agent's interaction with the user of client 102. In some embodiments, the dynamic link can automatically launch application 124 stored in memory module 112. For example, a dynamic link may automatically launch a program capable of generating a map or directions and return the appropriate map or directions for display on the agent's GUI. The agent could use this information to assist a user in reaching a specific location.

In various embodiments, the dynamic link can automatically search information source 126 and display the results on host 110. For example, a dynamic link may automatically search a directory and return the search results for display on the agent's GUI. The agent could use this information to expedite the call or to confirm that the information in the directory is correct. Moreover, the dynamic link could also automatically update the directory listing if the information returned was inaccurate. In other embodiments, the dynamic link can automatically search information source 126 and create a new information entry for information source 126 upon identifying that information source 126 does not currently include the new information.

In this example, the user of client 102 interacts with data collection mechanism 106a until the remaining information has been collected and/or provided to the user of client 102. In other embodiments, data collection mechanism 106a can associate the user of client 102 with another one of data collection mechanisms 106 to collect another portion of information from the user of client 102 using, for example, an IVR script.

a. Dynamic Linking to One or More Information Sources

In one particular embodiment, a live-agent using data collection mechanism 106a interacts with a user of client 102 using the XML-script to collect responses to one or more queries on host 110. In an alternative embodiment, an IVR-based data collection mechanism 106 or any other data collection mechanism could interact with a user of client 102 using script 122 to collect response to one or more queries. The XML-based script executed on host 110 includes one or more dynamic links that allow data collection mechanism 106a to automatically access, retrieve, amend, and/or update one or more information sources 126 from memory 112. In other embodiments, the one or more dynamic links can allow data collection mechanism 106a to, for example, automatically access, execute, launch, retrieve, amend, and/or update one or more applications 124 and/or any other appropriate utilities.

At some point during the interaction, for example after collecting a portion of information on host 110, a triggering event occurs that results in the automatic initiation of one or more functions associated with information sources 126. In one example, an agent using data collection mechanism 106a operates to collect information for ABC Software Company using script 122 and to enter that information on host 110. In response to a query, the agent enters the user's first and last name into a field displayed on host 110. Upon entering the user's first and last name script 122 automatically initiates a search of a directory that contains a listing of all known customers' of ABC, the customers' addresses, and phone numbers. Although a search is automatically initiated by the agent entering the first and last name in this example, any other appropriate triggering event may automatically initiate the search without departing from the scope of the present disclosure.

In this particular example, the search of the directory identifies that the user of client 102 is a known customer of ABC and returns the user's address and phone number for display on host 110. In some cases, the returned information could be used to populate, for example, at least a portion of the XML-based script or one or more fields displayed on host 110. As used throughout this document, the term "populate" refers to the correlation of a user's response to queries presented by a data collection mechanism or to the correlation of information returned after a triggering event to queries presented by a data collection mechanism. In other cases, the returned information could be displayed on host 110, for example, on a portion of a GUI that is separate from a portion of the GUI that displays the XML-based script.

The agent could use the user's address and phone number to expedite the information collection process and/or to confirm that such information is still correct. If the agent identifies that the stored information is not correct, the agent can enter the correct information. Upon entering the corrected information, script 122 automatically initiates an update on the information in the directory.

In other embodiments, the search of the directory identifies that the user of client 102 is not a known customer of ABC. Upon identifying that the user is not a known customer of ABC, the live-agent could request the desired information from the user of client 102. Upon entering the collected information, script 122 could automatically initiate the creation of a new information entry into ABC's directory.

In this particular embodiment, script 122 dynamically links to a directory. Although script 122 dynamically links to a directory in this example, script 122 may dynamically link to any other database or collection of information that is arranged or compiled without departing from the scope of the present disclosure. In an alternative embodiment, script 122 dynamically links to an InfoPage. In that embodiment, an agent using data collection mechanism 106a operates to collect information for XYZ Company using script 122 and to input that information on host 110. In response to one particular query, the agent enters that the user is requesting information from a person in XYZ's software department. After entering the word "software" script 122 automatically retrieves and displays on host a specific page of information relating to XYZ's software department and contacts. The agent could use information on the software department's InfoPage, for example, to provide the user of client 102 with a contact number or to automatically conference in a representative of the software department to answer the user's questions.

b. Dynamic Linking to One or More Applications

In another particular embodiment, a live-agent using data collection mechanism 106a interacts with a user of client 102 using the XML-script to collect responses to one or more queries on host 110. In an alternative embodiment, an IVR-based data collection mechanism 106 or any other data collection mechanism could interact with a user of client 102 using script 122 to collect a response to one or more queries. The XML-based script executed on host 110 includes one or more dynamic links that allow data collection mechanism 106a to automatically access, execute, and/or retrieve one or more applications 124 from memory 112. Applications 124 may comprise, for example, a program, a web-site, or any other utility. In other embodiments, the one or more dynamic links can allow data collection mechanism 106a to, for example, automatically access, retrieve, amend, and/or update one or more information sources 126 and/or any other appropriate utilities.

In some cases, the applications accessed, executed, and/or retrieved may be capable of, for example, generating a map or directions, managing one or more business or personal contacts, managing one or more on-call schedules for an entity, displaying a registration window or an ordering form, determining a dispatching priority for a message, or any other desired function. In other cases, the applications may be capable of, for example, placing a user of client 102 on hold, transferring a user of client 102 to another data collection mechanism 106, establishing a conference with another user of system 100, or any other desired phone action. In various embodiments, the one or more applications automatically initiated in response to the triggering event may reside locally within one or more information exchange mechanisms 106 or could reside in a location remote from and accessible to information exchange mechanisms 106, such as, for example, on a server or in memory accessible to mechanisms 106.

At some point during the interaction, for example after collecting a portion of information on host 110, a triggering event occurs that results in the automatic initiation of one or more functions associated with applications 124. In one particular example, an agent using data collection mechanism 106a operates to collect information for an automobile assistance agency (AAC) using script 122 and to enter that information into host 110. In response to one or more queries, the agent enters the location of the user into a field displayed on host 110. In some cases, the location can comprise, for example, an address, a mile marker on a particular interstate, an intersection of two streets, or any other appropriate location. Upon entering the location, script 122 automatically initiates the execution of a program capable of generating a map of the particular location and displays that map on host 110. Although a program capable of generating a map is launched in this example is automatically initiated by the agent entering the location of the user in this example, any other appropriate triggering event may automatically initiate the program without departing from the scope of the present disclosure.

The agent could use the map to identify, for example, the location of the nearest gas station, car repair center, traveler's assistance center, police station, hospital, or any other desired location. In some embodiments, upon identifying a desired final destination for the user and inputting such destination, script 122 could automatically retrieve directions to the desired location. In other embodiments, upon identifying a desired service center (e.g., the service center closest to the user), script 122 could automatically contact such service center. In those cases, script 122 could automatically retrieve directions from the service center to the location of the user. The agent or the system could communicate the directions and any other appropriate information to the service center.

In this particular embodiment, script 122 dynamically links to a program capable of generating a map. Although script 122 dynamically links to a program capable of generating a map in this example, script 122 may dynamically link to any other application or utility without departing from the scope of the present disclosure. In an alternative embodiment, script 122 dynamically links to an on-call scheduling program. In that embodiment, an agent using data collection mechanism 106a operates to collect information for a hospital using script 122 and to input that information on host 110. In response to one particular query, the agent enters the date of birth (or age) of a person needing assistance and/or the conditions that the person is experiencing. Upon entering the date of birth and/or the conditions that the person is experiencing, script 122 automatically launches an on-call scheduler program for the hospital. Script 122 also automatically determines the appropriate on-call schedule to access, retrieves the appropriate Doctor that is on-call, and displays that information on host 110. For example, if script 122 determines that the person needing assistance is three (3) years old, then script 122 would access the on-call schedule for the pediatricians, retrieve the contact information associated with the pediatrician on-call, and display that information on host 110. The agent could use the displayed information, for example, to provide the user of client 102 with a contact number of the pediatrician or to automatically contact or conference in the pediatrician with the user of client 102.

c. Dynamic Linking to a Customer Relationship Management Application

In a further embodiment, a live-agent using data collection mechanism 106a interacts with a user of client 102 using the XML-script to collect responses to one or more queries on host 110. In an alternative embodiment, an IVR-based data collection mechanism 106 or any other data collection mechanism could interact with a user of client 102 using script 122 to collect a response to one or more queries. The XML-based script executed on host 110 includes one or more dynamic links that allows data collection mechanism 106a to automatically access, execute, retrieve, amend, update and/or dispatch to a Customer Relationship Management (CRM) application stored in memory module 112. In this embodiment, the CRM application includes at least a contact management database that operates to store one or more business or personal contacts for an entity. In other embodiments, the contact management database could also operate to store notes or other information relating to the business or personal contacts.

At some point during the interaction with the user of client 102, for example after collecting a portion of information from the user, a triggering event occurs that results in the automatic initiation of one or more functions of the CRM application. In one non-limiting example, an agent using data collection mechanism 106a collects information for GenX Pharmaceutical Company using script 122 and enters that information into host 110. In response to a query, the agent enters the user's name and company that the user represents into one or more fields displayed on host 110. Upon entering the user's name and company, script 122 automatically initiates a search of the contact management database that contains a listing of all known customers of GenX (e.g., individuals, companies, partnerships, or any other entity), representatives of the customers, the address of the customers and representatives, the telephone numbers of the customers and representatives, and any other appropriate information. Although a search is automatically initiated in connection with the agent entering the user and company names in this example, any other appropriate triggering event may be used without departing from the scope of the present disclosure. In an alternative embodiment, script 122 could automatically search the contact management database upon receiving, for example, ANI information, Caller Identification information, Caller Name information, or a combination of these or other types of information communicated by client 102.

In this particular non-limiting example, the search of the contact management database identifies that the company that the user of client 102 represents is a known customer of GenX and returns the company address and phone number for display on host 110. The agent could use the customer information to expedite the information collection process and/or to confirm that such information is still correct. If the agent identifies that the information is incorrect, the agent can enter the correct information. Upon entering the corrected information, script 122 can automatically initiate an update of the information in the contact management database for the customer.

The search of the contact management database can also identify that the user of client 102 is not a known representative of the customer. Upon identifying that the user is not a known representative of the customer, the agent could collect the desired contact information from the user. In some embodiments, system 100 and data collection mechanisms 106 can operate to store the collected information in the contact management database for a particular entity. In this example, the agent collects information relating to the user of client 102 and/or a customer that the user is representing for a particular entity. The information entered by the agent can comprise, for example, the name of the user, the name of the company that the user is representing, the telephone number of the user, the address of the user, the reason or reasons why the user called, and/or any other information relating to the user or customer.

In this non-limiting example, as the agent is collecting the contact information for the user and/or confirming the company's information, script 122 could automatically initiate the creation of a new information entry into the contact management database of GenX. In some cases, the new information entry can comprise a new record for the particular user. In other cases, the new information entry can comprise a sub-record that is associated with a main-record of the customer that the user represents.

In other embodiments, the search of the contact management database can identify that both the customer and the user of client 102 are not known to a particular entity. In some embodiments, the search of the contact management database can identify that the user of client 102 is known to the entity and that the customer that the user is representing is not known to the entity. In either case, upon identifying that the user, the customer, or both are not a known to the entity, the agent could collect the desired contact information from the user. As the agent is collecting the contact information for the user, script 122 could automatically initiate the creation of a new information entry into the contact management database for the user, the customer, or both.

In this example, script 122 initiates the creation of the new information entry simultaneously with the agent collecting the necessary information from the user of client 102. In other embodiments, script 122 can initiate the creation of the new information entry after the agent has collected some or all the necessary information from the user. In some embodiments, script 122 can initiate the creation the new information entry before the agent has collected the information from the user. In that embodiment, script 122 could automatically search the contact management database and initiate the creation of the new information entry upon receiving, for example, ANI information, Caller Identification information, Caller Name information, or a combination of these or other types of information communicated by client 102.

The agent could use the collected and/or retrieved information to communicate a message to a particular entity. In various embodiments, script 122 could include a dynamic link that automatically dispatches the message to the particular entity or to a particular person associated with the entity. For example, if a user of client 102 is a new contact for a particular entity, then script 122 could operate to automatically dispatch a message to an appropriate sales representative of the entity. In other embodiments, script 122 could include a dynamic link that automatically initiates a phone related action upon the agent collecting the information from the user of client 102. For example, if the user of client 102 is a known contact for a particular entity, then script 122 could operate to automatically conference in or transfer the call the appropriate representative for the entity.

In this particular embodiment, system 100 and/or data collection mechanisms 106 operate as a service bureau or call center that collects information for another entity. In some embodiments, system 100 and/or data collection mechanisms 106 can operate to store the collected information in the contact management database for a particular entity. The collected information can be stored, for example, in a form that is electronically searchable and/or retrievable. In some cases, the contact management database can reside local to data collection mechanisms 106 or can reside remotely from data collection mechanisms 106. Moreover, the information collected and stored in the contact management database can be exported to a particular entity through a link such as network 104 or can be accessed by the particular entity through system 100.

Figure 2:
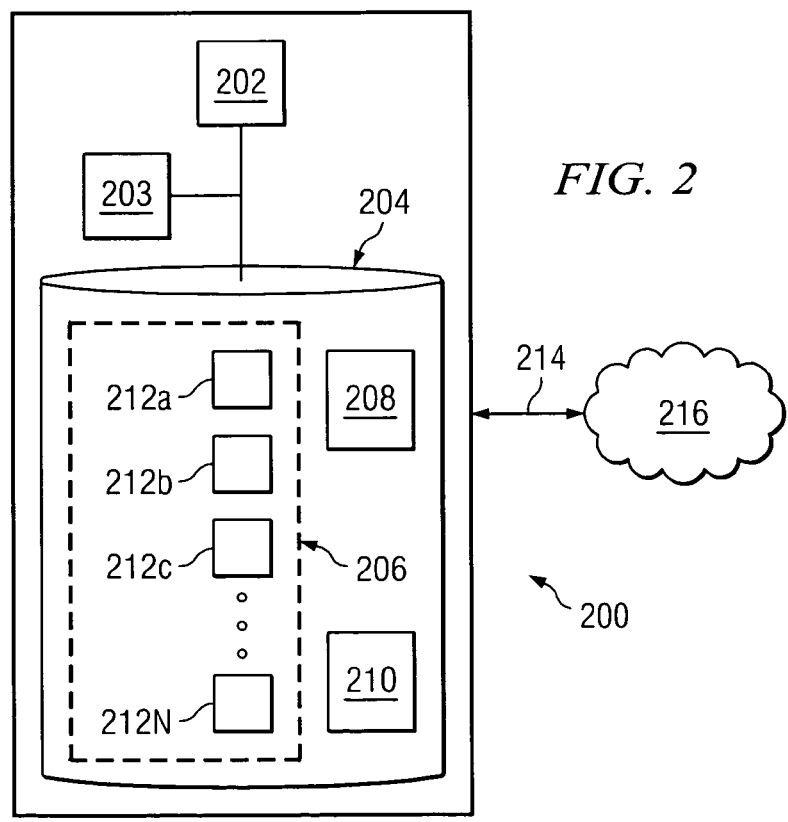
FIG. 2 is a block diagram of one embodiment of a data collection mechanism capable of collecting and storing at least a portion of information collected from a user of a client.

FIG. 2 is a block diagram of one embodiment of a data collection mechanism 200 capable of collecting and storing at least a portion of information collected from a user of a client. In some embodiments, the structure and function of data collection mechanism 200 can be substantially similar to data collection mechanisms 106 of FIG. 1. As non-limiting examples, data collection mechanism 200 could comprise an IVR system, an interactive web-based system, an agent-based system, or a combination these or other information collection systems. In this example, data collection mechanism 200 comprises at least an agent-based system that enables mechanism 200 to interact with and collect information from a user.

In this example, data collection mechanism 200 includes a software engine 202 capable of processing the desired communicating and/or computing functionality associated with data collection mechanism 200. Although mechanism 200 includes only one software engine 202 in this example, any other number of software engines may be used without departing from the scope of the present disclosure. In some embodiments, software engine 202 includes or has access to a response cache 203 for storing information collected during a user's interaction with data collection mechanism 200. In other embodiments, software engine 202 includes or has access to response cache 203 for XML rendering capabilities for dynamically generating web pages and/or database connectivity.

In this particular embodiment, software engine 202 has access to a memory 204 capable of storing a contact management database 206 collected during one or more user interactions with mechanism 200. Although this example depicts memory 204 as a single medium, memory 204 may comprise any additional number of storage media without departing from the scope of the present disclosure. Additionally, all or part of memory 204 could reside locally within information exchange mechanism 200 or could reside in a location remote from and accessible to information exchange mechanism 200.

Memory 204 is capable of storing contact management database 206, one or more scripts 208, and a CRM application 210. Memory 204 may include any hardware, software, firmware, or combination thereof operable to store and facilitate retrieval of information. Although memory 204 stores database 206, scripts 208, and CRM application 210 in this example, other information, applications, functions, or utilities may be stored on memory 204 without departing from the scope of the present disclosure. Memory 204 may store information using any of a variety of information structures, arrangements, and/or compilations.

Memory 204 may, for example, include a dynamic random access memory (DRAM), a static random access memory (SRAM), a NAND flash memory, or any other suitable volatile or nonvolatile storage and retrieval device or combination of devices. Although mechanism 200 includes a software engine 202 and a memory 204 in this example, other devices may be included in mechanism 200 without departing from the scope of the present disclosure. Moreover, there is no requirement that each of software engine 202 and memory 204 resides locally within mechanism 200 as shown in this example.

In this particular embodiment, data collection mechanism 200 comprises at least a portion of a service bureau or call center that collects information for another entity. Data collection mechanism 200 operates to retrieve, create, amend, store, and/or display one or more records 212 associated with contact management database 206. In this embodiment, contact management database 206 comprises a contact management database for a particular entity. In other embodiments, contact management database 206 could comprise, for example, one or more contact management databases for one or more entities. Although this example depicts contact management database 206 a single database, contact management database 206 may comprise any additional number of databases without departing from the scope of the present disclosure.

In this example, software engine 202 has access to one or more records 212 in contact management database 206. The one or more records 212 can be stored, for example, in a form that is electronically searchable and/or retrievable. In some cases, contact management database 206 can reside local to data collection mechanisms 200 or can reside remotely from data collection mechanisms 200. Moreover, contact management database 206 can be exported to a particular entity through or can be accessed by the particular entity through a communication link 214 and/or network 216. In one specific example, the structure and function of communication link 214 and network 216 can be substantially similar to communication link 120 and network 104 of FIG. 1, respectively.

Software engine 202 processes one or more scripts 208 capable of being used to collect information from one or more users interfacing with data collection mechanism 200. In various embodiments, scripts 208 can be substantially similar to scripts 122 of FIG. 1. In this particular embodiment, script 208 comprises an XML-based script that includes one or more dynamic links that allow data collection mechanism 200 to retrieve, create, amend, store, and/or display one or more records 212 associated with contact management database 206. In other embodiments, scripts 208 can include a common unitary script that enables software engine 202 to generate scripts for data collection mechanism 200 and other data collection mechanisms. For example, the common unitary script can be used to generate an IVR script for use by mechanism 200 and to generate an XML-based script for use by an agent based data collection mechanism. Scripts 208 may comprise, for example, software, firmware, code, portions of code, information compilations, and/or a combination of these or any other type of information.

In this example, a live-agent using data collection mechanism 200 interacts with a client coupled to mechanism 200 to collect responses to one or more queries associated with script 208. In response to one or more queries, the agent collects the user's name and the identification of the client that the user represents. Upon collecting the user's name and name of the client that the user represents, software engine 202 processes an item or element within script 208 that automatically initiates a search of records 212 within contact management database 206 that contain all the known clients of the particular entity, representatives of the clients, the address of the clients and representatives, the telephone numbers of the clients and representatives, and any other appropriate information. In an alternative embodiment, script 208 could automatically search the contact management database upon receiving, for example, ANI information, Caller Identification information, Caller Name information, or a combination of these or other types of information communicated by client 102.

In this particular example, the search of contact management database 206 identifies that record 212a contains information relating to the client that the user represents and returns the client contact information contained within record 212a for display to the agent using data collection mechanism 200. The agent could use the client information to expedite the information collection process and/or to confirm that such information is still correct. If the agent identifies that the information is incorrect, the agent can enter the correct information. Upon entering the corrected information, software engine 202 can processes an item or element within script 208 that can automatically initiate an update of the information in the contact management database for the customer.

The search of the contact management database also identifies that the user is not a known representative of the client. Upon identifying that the user is not a known representative of the client, the agent could collect the desired contact information from the user. The information collected by the agent can comprise, for example, the name of the user, the user's affiliation with the client, the telephone number of the user, the address of the user, the reason or reasons why the user called, and/or any other information relating to the user or client.

In this example, as the agent is collecting the contact information from the user, software engine 202 processes an item or element within script 208 that automatically initiates the creation of record 212b in contact management database 206. In other embodiments, script 208 can initiate the creation of record 212b after the agent has collected some or all the necessary information from the user. In some embodiments, script 208 can initiate the creation record 212b before the agent has collected any information from the user. In that embodiment, script 208 could automatically search the contact management database and initiate the creation of the new information entry upon receiving, for example, ANI information, Caller Identification information, Caller Name information, or a combination of these or other types of information communicated from the user.

In this particular embodiment, script 208 creates record 212b as a sub-record that is associated with a main-record of the client that the user represents. That is, script 208 creates record 212b as a sub-record of record 212a. In other embodiments, record 212b can comprise a new record that is not associated with a main-record.

In this example, the one or more records 212 associated with contact management database 206 are stored in memory 204. Storing records 212 in a memory that is accessible to multiple data collection mechanisms can prove advantageous when it is desired to subsequently access and process the records for a particular entity. In some embodiments, records 212 can be used to populate script 208 and/or a script used by another data collection mechanism. Populating scripts with the information contained within records 212 can help the data collection mechanisms interact more efficiently with a client. In other embodiments, records 212 can be accessed and/or exported to the particular entity to allow the entity to, for example, sell additional services to customers, to mine the information contained with records 212 to provide better service to customers, or for any other appropriate purpose.

In this particular embodiment, data collection mechanism 200 comprises an agent-based system. In an alternative embodiment, data collection mechanism 200 can comprise at least an IVR-based system that enables mechanism 200 to interact with and collect information from a user. In that embodiment, data collection mechanism 200 can also include a voice recognition module capable of processing voice responses, text-to-speech translations, and/or speech-to-text translations.

FIGS. 3A through 3D are illustrative examples of queries associated with scripts capable of being used by a data collection mechanism. The particular queries illustrated in FIGS. 3A-3D are intended for exemplary purposes only and are not intended to limit the scope of the present disclosure. In addition, the particular queries are not intended to depict any particular scripting format and/or a scripting hierarchy. In one particular embodiment, one or more data collection mechanisms may use at least some of the illustrated queries to collect information from a user of a information collection system, such as system 100 of FIG. 1. Although system 100 is used in this example, other systems may be used without departing from the scope of the present disclosure. In this embodiment, a user of system 100 initiates the information collection process by using a client 102 to connect to data collection mechanism 106a. In an alternative embodiment, any of data collection mechanisms 106 could initiate the process with client 102.

FIG. 3A illustrates one example of a series of queries 302 associated with a script 300 capable of being used by data collection mechanism 106a of FIG. 1 to collect information from client 102. In this example, script 300 comprises an IVR-based script that enables data collection mechanism 106b to interact with and collect information from a user of client 102. Although an IVR-based script is used in this example, other scripting formats may be used without departing from the scope of the present disclosure.

In this example, data collection mechanism 106b has presented queries 302a-302e to the user of client 102 and has collected responses 304a-304e from the user of client 102. Although five queries are presented in this example, any other number of queries may be presented without departing from the scope of the present disclosure. In this particular example, a user of client 102 interacts with data collection mechanism 106b by "speaking" a response 304 to the queries 302 presented by data collection mechanism 106b. Although a user "speaks" the responses in this example, a user may respond by other response mechanisms without departing from the scope of the present disclosure.

In this particular embodiment, script 300 includes one or more dynamic links that allow data collection mechanism 106b to automatically access, search, retrieve, amend, and/or update a directory stored in a memory accessible to data collection mechanism 106b upon the occurrence of one or more triggering events. The directory stored in the memory that is accessible to data collection mechanism 106b can comprise, for example, a list of employees, a list of doctors, list of customers, or list of any other type of information that can be organized by fields. Although script 300 dynamically links to a directory in this example, script 300 can dynamically link to any other function without departing from the scope of the present disclosure. For example, script 300 could dynamically link to one or more information sources, one or more applications, and/or any other utility.

In one non-limiting example, data collection mechanism 106b collects responses 304a-304e of the user. Upon collecting the first name and last name of the user for response 304b, script 300 automatically initiates a search of a directory that contains a listing of all known customers of ABC Computer and Software. In some cases, the directory listing may include, for example, the billing address, shipping address, credit card information, telephone number, and/or other purchase related information of the customer. In other cases, the directory may include, for example, the computer system purchased, software purchased, hardware purchased, and/or other information related to past purchases of the customer. Although the search is initiated by the collection of the first name and last name in this example, the search may be initiated by any other appropriate triggering event without departing from the scope of the present disclosure.

The search of the directory for "Frank Smith" identifies that the user is indeed a known customer of ABC. In this example, the search returns the address and telephone numbers of the user and populates the queries 302c and 302d with the appropriate information. Using the information returned from the search, data collection mechanism 106b confirms that the telephone number and the address of the user are correct. In this example, by collecting response 304d, data collection mechanism 106b identifies that the billing address of the user is incorrect. Based on response 304d, script 300 presents query 302e to the user of client 102. Data collection mechanism 106b collects a corrected address in response 304e. Upon collecting the corrected address, script 300 automatically initiates an update of the address within the directory for the user (not explicitly shown). Although the updating of the directory listing is initiated by responses 304d and 304e in this example, the update may be initiated by any other appropriate triggering event without departing from the scope of the present disclosure.

In alternative embodiments, the search of the directory may identify that the user is not a known customer of ABC. Upon identifying that the user is not a known customer, data collection mechanism 106b could request the billing information from the user. Upon collecting the information, the IVR-based script could automatically initiate the creation of a new information entry into the know customer directory of ABC.

In this embodiment, after data collection mechanism 106b collects the user's responses 304a-304e, the user of client 102 is associated with data collection mechanism 106a to further collect information from the user. In an alternative embodiment, data collection mechanism 106b could interact with the user of client 102 until all the desired information has been collected from the user.

Figure 3B:
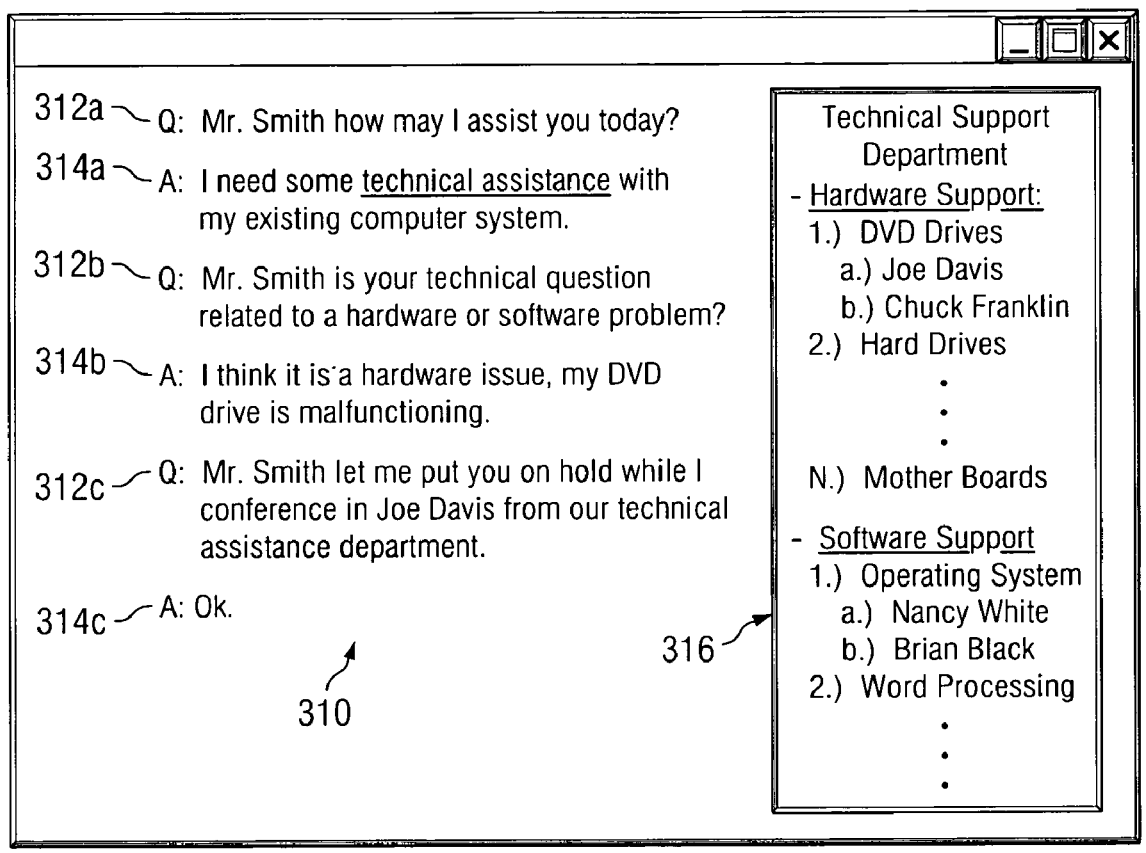

FIG. 3B illustrates one example of a series of queries 312 associated with a script 310 capable of being used by data collection mechanism 106a of FIG. 1 to collect information from client 102. In this example, script 310 comprises an XML-based script that enables an agent using data collection mechanism 106a to interact with and collect information from the user of client 102. Although an XML-based script is used in this example, any other scripting format may be used without departing from the scope of the present disclosure.

In this example, a live agent using data collection mechanism 106a has presented queries 312a-312c and has collected responses 314a-314c from the user of client 102. Although three queries have been presented in this example, any other number of queries may be presented without departing from the scope of the present disclosure. In this particular example, a user of client 102 interacts with data collection mechanism 106a by "speaking" a response 314 to queries 312 presented by data collection mechanism 106a.

In this particular embodiment, script 310 includes one or more dynamic links that allows data collection mechanism 106a to automatically access and/or retrieve one or more InfoPages 316 stored in a memory accessible to data collection mechanism 106a upon the occurrence of one or more triggering events. InfoPage 316 may comprise any information that may assist the agent during the interaction with the user of client 102. For example, InfoPage 316 may comprise general information about a particular company, information about a particular department of a company, information about order processing, instructions for processing a particular type of call, or any other information that may assist an agent during the interaction with the user. Although script 310 dynamically links to InfoPage 316 in this example, script 310 dynamically link to any other function without departing from the scope of the present disclosure.

In one non-limiting example, an agent using data collection mechanism 106a collects responses 314a-314b of the user and enters those responses into fields displayed on host 110. Upon entering the phrase "technical assistance" in response 314a, script 310 automatically retrieves and displays an InfoPage 316 for the Technical Support Department of ABC. Although the retrieval and display is initiated by the collection of a particular phrase in this example, any other triggering event may be used without departing from the scope of the present disclosure.

In this particular non-limiting example, InfoPage 316 comprises information about the Technical Support Department of ABC. The display of InfoPage 316 allows the agent to identify the technical support person capable of resolving the user's problem. In this example, Mr. Smith identified that his DVD drive is malfunctioning. Using InfoPage 316, the agent can identify that either Joe Davis or Chuck Franklin of ABC's technical support department are available to assist Mr. Smith in resolving his DVD related problem.

In this example, script 310 also includes one or more dynamic links that allows data collection mechanism 106a to automatically initiate one or more phone related actions upon the occurrence of a triggering event. The one or more phone related actions can comprise, for example, placing the user on hold, conferencing in another person, transferring the user to another person, ending the call, or any combination of these of other phone related activities. In this particular embodiment, script 310 automatically places the user of client 102 on hold upon the user responding to query 312c. Moreover, script 310 also operates to create a conference call between the live agent, the user, and a particular person from the technical support department (e.g., Joe Davis) (not explicitly illustrated). After the conference call, the agent can, for example, continue interacting with the user of client 102, transfer the user of client 102 to another data collection mechanism 106, or may end the call with the user.

In an alternative embodiment, the dynamic link could automatically dispatch a message to the technical support department. For example, if all the personnel from the technical support department were assisting other callers, then the agent could inform the user of client 102 that an appropriate person from the technical support will contact them within, for example, the next business day, within two business days, or within the next five business days. After the agent informs the user of client 102, the agent may end the call with the user. Script 310 could automatically dispatch a message to the appropriate personnel within the technical support department.

The message can be dispatched to the appropriate personnel within the technical support department by, for example, emailing, faxing, mailing, paging, or by any other appropriate dispatching method. In various embodiments, script 310 can determine the method of dispatching the message to the technical support department. In some cases, script 310 can determine the method of dispatching based at least in part on the time of day the message is received. For example, if data collection mechanism 106a collects the information for the message after business hours, then script 310 can determine that the message should be dispatched using after business hours method of dispatching (e.g., faxing, emailing, or any other appropriate method). In other cases, script 310 can determine the method of dispatching based at least in part on the content of the message or the importance of the message. For example, if the user is regarded as a particularly important customer or the content of the message is critical to the business, then script 310 can determine that the message should be dispatched using a high priority method of dispatching (e.g., paging, emailing, or any other appropriate method).

Figure 3C:
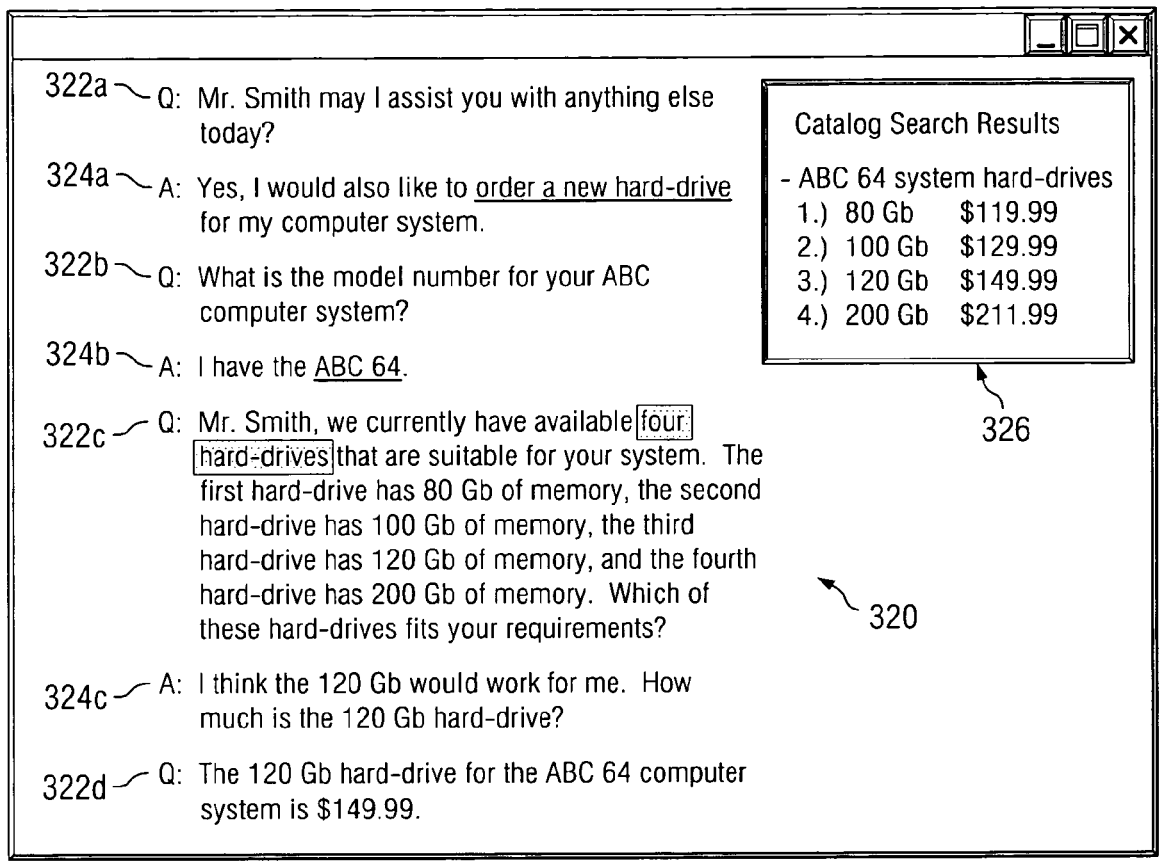

FIG. 3C illustrates one example of a series of queries 322 associated with a script 320 capable of being used by data collection mechanism 106a of FIG. 1 to collect information from client 102. In this example, script 320 comprises an XML-based script that enables an agent using data collection mechanism 106a to interact with and collect information from the user of client 102. Although an XML-based script is used in this example, any other scripting format may be used without departing from the scope of the present disclosure.

In this example, a live agent using data collection mechanism 106a has presented queries 322a-322d and has collected responses 324a-324c from the user of client 102. Although four queries have been presented in this example, any other number of queries may be presented without departing from the scope of the present disclosure. In this particular example, a user of client 102 interacts with data collection mechanism 106a by "speaking" a response 324 to queries 322 presented by data collection mechanism 106a.

In this particular embodiment, script 320 includes one or more dynamic links that allows data collection mechanism 106a to automatically access, search, retrieve, and/or display at least a portion of a database stored in a memory accessible to data collection mechanism 106a upon the occurrence of one or more triggering events. Although script 320 dynamically links to a database in this example, script 320 can dynamically link to any other function without departing from the scope of the present disclosure.

In one non-limiting example, the agent collects responses 324a and 324b of the user and enters those responses into fields displayed on host 110. Upon entering the word "order" and the phrase "new hard-drive" in response 324a and the phrase "ABC 64" in response 324b, script 320 automatically initiates a search of a database that contains a catalog of the hardware and software that are capable of being ordered for ABC's computer systems. Moreover, script 320 automatically retrieves and displays the search results in a search results screen 326. Although the search, retrieval, and display are initiated by the input of particular words and phrases in this example, any other triggering event may be used without departing from the scope of the present disclosure.

In this particular non-limiting example, the search of the database identifies that there are four hard-drives that are suitable for use with the ABC 64 computer system. Moreover, the results of the search are automatically displayed within search results screen 326 on host 110 for use by the agent in assisting the user of client 102. The agent could use the information in search results screen 326 to identify the appropriate hard-drive for the user. In some embodiments, the information returned from the search can be used to automatically populate one or more fields within script 320. For example, the information relating to the four hard-drives can be used to automatically populate query 322c with the appropriate information.

In this embodiment, after the live-agent collects the user's responses 324a-324c, the user continues to interact with the agent associated with data collection mechanism 106a until the order has been fully processed. In other embodiments, the agent could associate the user with another data collection mechanism 106 to collect the information necessary to process the order.

FIG. 3D illustrates one example of a series of queries 342 associated with a script 340 capable of being used by data collection mechanism 106a of FIG. 1 to collect information from client 102. In this example, script 340 comprises an XML-based script that enables data collection mechanism 106a to interact with and collect information from a user of client 102. Although an XML-based script is used in this example, other scripting formats may be used without departing from the scope of the present disclosure.

In this example, a live-agent using data collection mechanism 106a has presented queries 342a-342h to the user of client 102 and has collected responses 344a-344g from the user of client 102. Although eight queries are presented in this example, any other number of queries may be presented without departing from the scope of the present disclosure. In this particular example, a user of client 102 interacts with the agent by "speaking" a response 344 to queries 342 presented by data collection mechanism 106a. Although a user "speaks" his responses in this example, a user may respond by other response mechanisms without departing from the scope of the present disclosure.

In this particular embodiment, script 340 dynamically links to an application upon the occurrence of one or more triggering events. The application can comprise, for example, one or more programs, one or more web-sites, or any other utility. In various embodiments, the application may be capable of, for example, generating a map or directions, managing one or more business or personal contacts, managing one or more on-call schedules for an entity, displaying a registration window or an ordering form, determining a dispatching priority for a message, or any other desired function. In one non-limiting example, script 340 includes one or more dynamic links that allows data collection mechanism 106a to automatically access, retrieve, display, and/or populate an order form 346 that is accessible to data collection mechanism 106a upon the occurrence of one or more triggering events. Although script 340 dynamically links to an order form in this example, script 340 can dynamically link to any other function without departing from the scope of the present disclosure.

In this one non-limiting example, an agent using data collection mechanism 106a collects responses 344a-344g of the user and enters those responses into fields displayed on host 110. Upon entering response 344a, script 340 automatically access and/or initiates the execution of a program capable of collecting ordering information. Moreover, script 340 automatically retrieves and displays an order form screen 346. Although the retrieval and display of the order form screen 346 is initiated by a particular response in this example, any other triggering event may be used without departing from the scope of the present disclosure.

In this non-limiting example, script 340 also includes one or more dynamic links that allows data collection mechanism 106a to automatically populate one or more fields within order form 346. For example, upon collecting responses 344c-344f, script 340 can automatically populate the payment type, credit card number, and expiration date fields within order form screen 346. Moreover, upon collecting response 344b, script 340 can automatically access and retrieve the billing address of the user from a directory that contains a listing of all know customers of ABC Computer and Software. After retrieving the billing address, script 340 can automatically populate the billing information and shipping information fields relating to name, address, city, state, and zip code within order form screen 346. In addition, upon collecting response 344a, script 340 can automatically access and retrieve product information from a database that contains a catalog of the hardware and software that are capable of being ordered for ABC's computer systems. After retrieving the product information, script 340 can automatically populate the item and cost fields within order form screen 346. In an alternative embodiment, an agent could input the appropriate information into the fields of order form screen 346 and script 340 could operate to automatically populate, for example, responses 344c-344f. Although the populating of the fields of order form screen 346 are initiated by responses 344a-344f in this example, any other appropriate triggering event may be used without departing from the scope of the present disclosure.

Script 340 also includes one or more dynamic links that allows data collection mechanism 106a to automatically dispatch the information within order form screen 346. For example, upon collecting response 344g, script 340 can automatically dispatch a message containing the information within order form screen 346 to an order processing department of ABC. The message can be dispatched to the order processing department by, for example, emailing, faxing, mailing, paging, or by any other appropriate dispatching method. In various embodiments, script 340 can determine the method of dispatching the message. In some embodiments, the dispatching method can be determined by one or more business rules. For example, if the product being purchased is currently in stock, then script 340 can determine that the message should be dispatched using the in-stock dispatching method (e.g., faxing or emailing the ordering information for immediate distribution).

In this particular embodiment, order form screen 346 is displayed on host 110 of data collection mechanism 106a. In an alternative embodiment, script 340 includes one or more dynamic links that allows data collection mechanism 106a to automatically access and/or populate a particular web-site that is accessible to data collection mechanism 106a upon the occurrence of one or more triggering events. In that embodiment, upon collecting the information from the user, script 340 could automatically access a web-page capable of generating an order for a particular entity. Moreover, script 340 could automatically populate the appropriate fields within the web-page with the information collected in responses 344a-344g and complete the ordering transaction.

Although the examples shown in FIGS. 3A-3D involve collecting information at an IVR-based mechanism or a live-agent mechanism and dynamically linking from that mechanism, the disclosed methods could equally apply to collecting information from any web-based mechanism, IVR-mechanism, or other information collecting mechanisms and dynamic linking from one or more of those mechanisms.

Figure 4A:
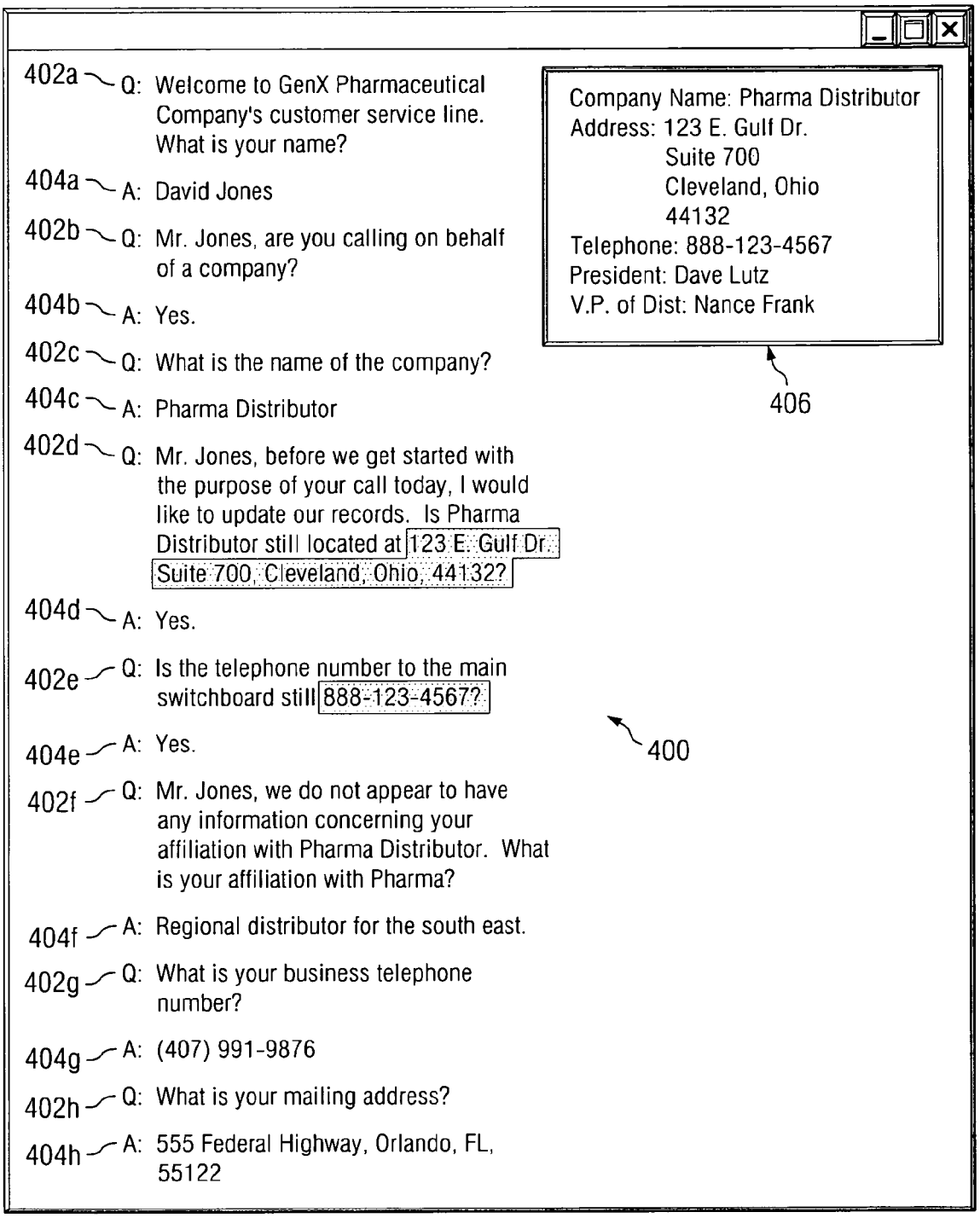

FIGS. 4A and 4B are illustrative examples of queries associated with scripts capable of being used by a data collection mechanism. The particular queries illustrated in FIGS. 4A and 4B are intended for exemplary purposes only and are not intended to limit the scope of the present disclosure. In addition, the particular queries are not intended to depict any particular scripting format and/or a scripting hierarchy. In one particular embodiment, one or more data collection mechanisms may use at least some of the queries to collect information from a user of a information collection system, such as system 100 of FIG. 1. Although system 100 is used in this example, other systems may be used without departing from the scope of the present disclosure. In this embodiment, a user of system 100 initiates the information collection process by using a client 102 to connect to data collection mechanism 106a. In an alternative embodiment, data collection mechanism 106a can initiate the process with client 102.

FIG. 4A illustrates one example of a series of queries 402 associated with a script 400 capable of being used by data collection mechanism 106a of FIG. 1 to collect information from client 102. In this particular embodiment, data collection mechanism 106a using script 400 operates as at least a portion of a service bureau or call center that collects information for another entity. In this example, script 400 comprises an XML-based script that enables data collection mechanism 106a to interact with and collect information from a user of client 102. Although an XML-based script is used in this example, other scripting formats may be used without departing from the scope of the present disclosure.

In this example, a live agent using data collection mechanism 106a has presented queries 402a-402h and has collected responses 404a-404h from the user of client 102. Although eight queries have been presented in this example, any other number of queries may be presented without departing from the scope of the present disclosure. In this particular example, a user of client 102 interacts with data collection mechanism 106a by "speaking" a response 404 to the queries 402 presented by data collection mechanism 106a. Although a user "speaks" his responses in this example, a user may respond by other response mechanisms without departing from the scope of the present disclosure.

In this particular embodiment, script 400 includes one or more dynamic links that allow data collection mechanism 106a to automatically access, execute, retrieve, amend, and/ or update to a Customer Relationship Management (CRM) application stored in a memory accessible to data collection mechanism 106a upon the occurrence of one or more triggering events. In this embodiment, the CRM application includes at least a contact management database that operates to store one or more business or personal contacts for an entity. In other embodiments, the contact management database could also operate to store notes or other information relating to the business or personal contacts. Although script 400 dynamically links to CRM application in this example, script 400 can dynamically link to any other function without departing from the scope of the present disclosure.

In one non-limiting example, an agent using data collection mechanism 106a collects responses 404a-404c of the user and enters those responses into fields displayed on host 110. Upon entering the name of the user "David Jones" and the name of the company "Pharma Distributor" in response 404a and 404c, respectively, script 400 automatically searches the contact management database that contains a listing of all known customers of GenX (e.g., companies, partnerships, or any other entity), representatives of the customers, the address of the customers and representatives, the telephone numbers of the customers and representatives, and any other appropriate information. Although the search is initiated by the collection of particular information in this example, any other triggering event may be used without departing from the scope of the present disclosure. In an alternative embodiment, script 400 could automatically search the contact management database upon receiving, for example, ANI information, Caller Identification information, Caller Name information, or a combination of these or other types of information communicated by client 102.

The search of the contact management database for "Pharma Distributors" identifies that Pharma Distributor is indeed a known customer of GenX. In this example, script 400 also automatically initiates the retrieval and display of the contact information for Pharma Distributors in a contact information screen 406 on host 110. In some embodiments, script 400 can automatically populate one or more queries to be presented to the user of client 102. For example, script 400 could automatically populate the address information into query 402d and the telephone information into query 402e for presentation to the user. Using the information returned from the search, the agent confirms that the address and telephone number for the customer are correct. In some embodiments, if the agent identifies that the address and/or telephone number for the customer are incorrect, the agent can enter the correct information. In those embodiments, upon entering the corrected information, script 400 could automatically initiate an update of the information stored in the contact management database for the customer.

The search of the contact management database for "David Jones" identifies that the user is not a known customer or a representative of a known customer. Upon identifying that the user is not a known customer or representative of a known customer, the agent using script 400 presents queries 402f-402h to the user. In this example, as the agent is collecting responses 404f-404h, script 400 automatically initiates the creation of a new information entry into the contact management database of GenX. In some cases, the new information entry can comprise a new record for the particular user. In other cases, the new information entry can comprise a sub-record that is associated with a main-record of the customer that the user represents.

In this example, script 400 initiates the creation of the new information entry simultaneously with the agent collecting responses 404f-404h from the user of client 102. In some embodiments, script 400 can initiate the creation of the new information entry after the agent has collected some or all the necessary information from the user. In other embodiments, script 400 can initiate the creation the new information entry before the agent has collected the information from the user. In those embodiments, script 400 could automatically search the contact management database and initiate the creation of the new information entry upon receiving, for example, ANI information, Caller Identification information, Caller Name information, or a combination of these or other types of information communicated by client 102.

FIG. 4B illustrates one example of a series of queries 452 associated with a script 450 capable of being used by data collection mechanism 106a of FIG. 1 to collect information from client 102. In this particular embodiment, data collection mechanism 106a using script 450 operates as at least a portion of a service bureau or call center that collects information for another entity. In this example, script 450 comprises an XML-based script that enables data collection mechanism 106a to interact with and collect information from a user of client 102. Although an XML-based script is used in this example, other scripting formats may be used without departing from the scope of the present disclosure.

In this example, a live agent using data collection mechanism 106a has presented queries 452a-452f and has collected responses 454a-454e from the user of client 102. Although six queries have been presented in this example, any other number of queries may be presented without departing from the scope of the present disclosure. In this particular example, a user of client 102 interacts with data collection mechanism 106a by "speaking" a response 454 to the queries 452 presented by data collection mechanism 106a. Although a user "speaks" his responses in this example, a user may respond by other response mechanisms without departing from the scope of the present disclosure.

In this particular embodiment, script 450 includes one or more dynamic links that allow data collection mechanism 106a to automatically access, retrieve, and/or display to an InfoPage 456 stored in a memory accessible to data collection mechanism 106a upon the occurrence of one or more triggering events. Info Page 456 can comprise any information that may assist the agent during the interaction with the user of client 102. For example, InfoPage 456 may comprise general information about a particular entity, information about a particular department of the entity, instructions for processing a particular type of call, or any other information that may assist the agent during the interaction with the user. Although script 450 dynamically links to InfoPage 456 in this example, script 450 can dynamically link to any other function without departing from the scope of the present disclosure.

In one non-limiting example, an agent collects responses 404f of FIG. 4A and 454a of the user and enters those responses into fields displayed on host 110. Upon entering the phrases "regional distributor for the south east" and "supply pharmaceuticals to my region," script 450 automatically retrieves and displays InfoPage 456 for the regional sales representatives of GenX. Although the retrieval and display of InfoPage 456 is initiated by the collection of particular information in this example, any other triggering event may be used without departing from the scope of the present disclosure.

The display of InfoPage 456 allows the agent to identify the appropriate sales representative of GenX for the south east region. In this particular embodiment, script 456 also includes one or more dynamic links that automatically populates queries 452c and 452d with information relating to sales representative for the south east region. In an alternative embodiment, the agent could use the information displayed in InfoPage 456 to identify that Jennifer James is the GenX sales representative for the south east region and to provide that information to the user of client 102.

The agent could use the collected and/or retrieved information to communicate a message to a particular entity. In this embodiment, script 450 includes one or more dynamic links that allows data collection mechanism 106a to automatically dispatch at least some of the collected information to a particular entity or to a particular person associated with the entity. In one non-limiting example, an agent collects response 454b from the user and enters that response into the field displayed on host 110. Upon entering response 454b, script 450 automatically dispatches a message to the customer relations department of GenX to have the appropriate information sent to the user of client 102. In addition, upon the agent collecting response 454d, script 450 also automatically dispatches a message to the sales representative of the south east. The message can comprise, for example, the name of the user, the name of the customer that the user represents, the address of the user, the telephone number of the user, and a note that indicates what information the user is requesting.

The message can be dispatched to the appropriate person within a particular entity (e.g., a sales representative) or to a particular department with the entity (e.g., the customer relations department) by, for example, mailing, faxing, emailing, or by any other appropriate dispatching method. In various embodiments, script 450 can determine the method of dispatching the message to the appropriate person and/or the appropriate department within the entity. In some cases, script 450 can determine the method of dispatching based at least in part on the time of day the message is received. For example, if data collection mechanism 106a collects the information for the message after business hours, then script 450 can determine that the message should be dispatched using after business hours method of dispatching (e.g., faxing, emailing, or any other appropriate method). In other cases, script 450 can determine the method of dispatching based at least in part on the content of the message or the importance of the message. For example, if the user represents an important customer or the content of the message is critical to the entity, then script 450 can determine that the message should be dispatched using a high priority method of dispatching (e.g., paging, emailing, or any other appropriate method).

In an alternative embodiment, script 450 could also includes on or more dynamic links that allows data collection mechanism 106a to automatically initiate one or more phone related actions upon the occurrence of a triggering event. The one or more phone related actions can comprise, for example, placing the user on hold, conferencing in another person, transferring the user to another person, ending the call, or any combination of these of other phone related activities. For example, script 450 could automatically place the user of client 102 upon the user responding to a particular query. Moreover, script 450 could also automatically create a conference call between the live agent, the user, and a particular person from the entity (e.g., the appropriate sales representative).

Although the examples shown in FIGS. 4A and 4B involve collecting information at an XML-based mechanism and dynamically linking from that mechanism, the disclosed methods could equally apply to collecting information from any web-based mechanism, IVR-mechanism, or other information collecting mechanisms and dynamic linking from one or more of those mechanisms.

Figure 5:
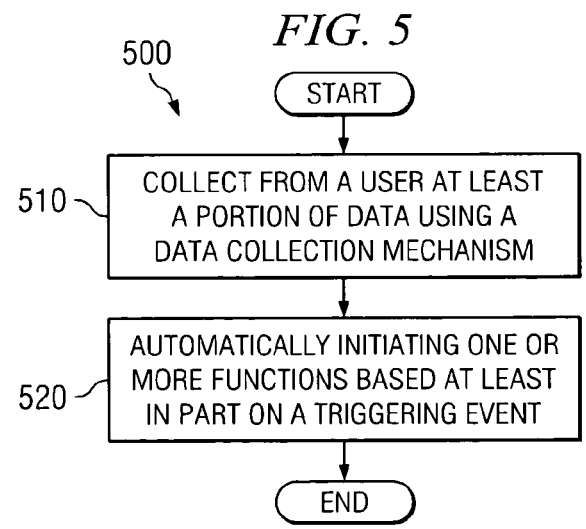
FIG. 5 is a flow chart illustrating an exemplary method for providing information collection from a client.

FIG. 5 is a flow chart illustrating an exemplary method for providing information collection from a client. In one particular embodiment, information may be collected from a client at a data collection mechanism through system 100 of FIG. 1. Although system 100 is used in this example, other systems may be used without departing from the scope of the present disclosure. In this embodiment, a user of system 100 has initiated the information collection process by using a computing and/or communication device to connect to data collection mechanism 106a; alternatively, data collection mechanism 106a has initiated the process with client 102.

In one non-limiting example, after initiation of the information collection process, data collection mechanism 106a operates to collect information from the user of client 102 using host 110, communication device 114, and script 122. In that example, host 110 executes a script that enables an agent using data collection mechanism 106a to interact with and collect information from client 102. In various embodiments, the script executed by host 110 may comprise, for example, an IVR-based script, an HTML-based script, an XML-based script, a VML-based script, or a combination of these or other scripting formats. In this particular embodiment, script 122 executed on data collection mechanism 106a includes one or more dynamic links.

In this example, method 500 begins at step 510 where a data collection mechanism 106 collects at least a first portion of information using script 122 having one or more queries for information. A user of client 102 can interact with data collection mechanism 106 by speaking, keying, or otherwise giving responses to the queries associated with script 122. In this particular embodiment, the user of client 102 responds to each of the series of queries by "speaking" a response to each query associated with script 122.

In this particular embodiment, an agent using data collection mechanism 106a receives the spoken responses for each of the queries associated with script 122 and inputs the spoken response into host 110. Although an agent receives and inputs the responses to the queries in this example, data collection mechanisms 106 could alternatively receive and input the responses without involving a live agent. For example, if data collection mechanism 106a comprises a speech recognition module capable of processing voice responses, then data collection mechanism 106 could automatically receive and input the responses without having the agent do so.

At some point during the information collection process a triggering event occurs that results in the automatic initiation of one or more functions at step 520. The one or more functions may comprise, for example, accessing, executing, retrieving, amending, storing, and/or updating one or more applications 124, one or more information sources 126, one or more phone related action, and/or any other appropriate utilities. Moreover, the one or more functions automatically initiated in response to the triggering event may reside locally within one or more information exchange mechanisms 106 or could reside in a location remote from and accessible to information exchange mechanisms 106.

In various embodiments, the one or more applications 124 can comprise, for example, a program, a web-site, or other utility capable of performing a desired function. For example, the one or more applications 124 may be capable of generating a map or directions, managing one or more business or personal contacts, managing one or more on-call schedules for an entity, displaying a registration window or an ordering form, determining a dispatching priority for a message, or any other desired function. In some embodiments, the one or more information sources 124 can comprise, for example, a directory, a database, a contact management database, or any other collection of information that is arranged or compiled. In other embodiments, the one or more phone related actions may comprise, for example, placing a user of client 102 on hold, transferring a user of client 102 to another data collection mechanism 106, establishing a conference with another user of system 100, or any other desired phone action.

The triggering event that results in the automatic initiation of one or more functions may comprise any criterion or combination of criteria that is related to the information received in response to script 122 being executed on data collection mechanism 106. In this particular embodiment, the triggering event is based at least in part or at least some of the information collected from the user of client 102. In various embodiments, the information can be collected by a live agent, for example, entering one or more words into a field or message screen, selecting one or more options from a pull-down menu, performing a series of key strokes, or a combination of these or other criteria. In other embodiments, the information can be collected by, for example, an IVR-based system that is capable of performing at least a speech-to-text translation. In some embodiments, at least some of the information can be automatically collected by data collection mechanism 106a. For example, data collection mechanism may automatically collected Automatic Number Identifier (ANI) information, Caller Identification information, Caller Name, alarm interfaces, and other information interfaces that are not operator or live agent based.

In various embodiments, at least some of the information retrieved from the one or more functions can be used by data collection mechanism 106a to further assist the user. For example, data collection mechanism 106a could use the retrieved information to collect additional information from the user. In other embodiments, at least some of the information retrieved from the one or more functions could be used to populate at least some of the queries associated with script 122. In some embodiments, at least some of the information retrieved from the one or more information sources can be displayed on data collection mechanism 106a.

In one particular embodiment, data collection mechanism 106a comprises at least a portion of a service bureau or call center that collects information for another entity. In some embodiments, system 100 and/or data collection mechanisms 106 can operate to store the collected information in the contact management database for a particular entity. The collected information can be stored, for example, in a form that is electronically searchable and/or retrievable. In some cases, the contact management database can reside local to data collection mechanisms 106 or can reside remotely from data collection mechanisms 106. Moreover, the information collected and stored in the contact management database can be accessed by and/or exported to a particular entity through network 104.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A communication system capable of collecting information from one or more users of the communication system, the system comprising:

one or more data collection mechanisms comprising at least one computing device operated to collect at least a portion of information from a user of a communication system on behalf of a second entity, wherein the first entity comprises an entity that is different than the second entity, wherein the one or more data collection mechanisms use a script to collect the portion of information from the user, the script having one or more dynamic links in the script to automatically initiate the performance of one or more functions during the collection of information from the user, wherein the performance of the one or more functions comprises accessing an application or information source to automatically populate one or more open fields in the script when at least one other field of the script is populated with a portion of the information collected from the user; and one or more memory modules coupled to the one or more data collection mechanisms and operable to store one or more records on behalf of the second entity, each of the one or more records comprising information associated with a client of the second entity and at least one of the one or more records comprising at least a portion of the information collected from the user of the communication system, wherein the one or more records are controlled by the first entity, wherein the first entity operates to export the one or more records stored in the one or more memory modules to the second entity by communicating the one or more records through a network coupled to the one or more memory modules.

2. The system of claim 1, wherein the portion of information collected from the user is selected from the group consisting of contact information of the user, contact information for an entity that the user represents, or one or more notes relating to a purpose of information collection from the user.

3. The system of claim 1, wherein the one or more data collection mechanisms are selected from the group consisting of an interactive voice response system, an interactive web-based system, or a live-agent based system.

4. The system of claim 1, wherein the portion of the script further comprises one or more queries for information to the user.

5. The system of claim 1, wherein the one or more records operate to form a contact management database for the second entity.

6. The system of claim 1, wherein the one or more records are stored within the one or more memory modules in a form that is electronically searchable.

7. The system of claim 1, wherein the one or more records comprise at least a first record that includes the contact information for the user of the communication system and at least a second record that includes the contact information for a client of the second entity that the user represents.

8. The system of claim 7, wherein the first record is a sub-record of the second record.

9. The system of claim 1, wherein the first entity provides access to the one or more records stored in the one or more memory modules to the second entity through a network coupled the one or more memory modules.

10. The system of claim 1, wherein the first entity comprises a call center that operates to collect information for the second entity using the one or more data collection mechanisms.

11. The system of claim 1, wherein the one or more dynamic links in the script are operable to initiate the performance of the one or more functions in response to a triggering event; and wherein the data collection mechanism is further operable to:

detect the occurrence of the triggering event; and
automatically initiate the performance of the one or more functions in response to detecting the triggering event.

12. The system of claim 11, wherein the triggering event comprises at least one criterion that is related to the information received from the user in response to the script being used to collect data from the user.

13. The system of claim 11, wherein the triggering event comprises an action performed by a live agent.

14. The system of claim 1, wherein:
the one or more memory modules comprise a plurality of memory modules;
each of the plurality of memory modules comprise a contact management database associated with a selected one of a plurality of entities; and
each contact management database comprises a plurality of records associated with associated customers of a particular entity.

15. The system of claim 14, wherein each contact management database is accessible to a plurality of employees of a particular entity associated with a particular contact management database.

16. A communication system capable of collecting information from one or more users of the communication system, the system comprising:
one or more data collection mechanisms comprising at least one computing device operated by a first entity to collect at least a portion of information from a user of a communication system on behalf of a second entity, wherein the first entity comprises an entity that is different than the second entity; and
one or more memory modules coupled to the one or more data collection mechanisms and operable to store one or more records on behalf of the second entity, each of the one or more records comprising information associated with a client of the second entity and at least one of the one or more records comprising at least a portion of the information collected from the user of the communication system, wherein the one or more records are controlled by the first entity, wherein the first entity provides access to the one or more records stored in the one or more memory modules to the second entity through a network coupled to the one or more memory modules;
wherein the one or more data collection mechanisms use at least a portion of a script comprising one or more queries for information to the user and one or more dynamic links in the script to collect and store the information; and
wherein the one or more dynamic links automatically initiate the creation and storage of the one or more records on behalf of the second entity when at least one field of the script is populated with a portion of the information collected from the user.

17. The system of claim 16, wherein the one or more dynamic links in the script are operable to initiate the creation of the one or more records in response to a triggering event; and wherein the data collection mechanism is further operable to:
detect the occurrence of the triggering event; and
automatically initiate the creation of the one or more records in response to detecting the triggering event.

18. The system of claim 17, wherein the triggering event comprises receiving identification information associated with the user.

19. The system of claim 18, wherein the identification information is received by a live agent.

20. The system of claim 18, wherein the identification information is selected from the group consisting of ANI information, caller identification information, and caller name information.

21. The system of claim 16, wherein:
the one or more memory modules comprise a plurality of memory modules;
each of the plurality of memory modules comprise a contact management database associated with a selected one of a plurality of entities; and
each contact management database comprises a plurality of records associated with associated customers of a particular entity.

22. The system of claim 21, wherein each contact management database is accessible to a plurality of employees of a particular entity associated with a particular contact management database.

23. The system of claim 16, wherein the portion of information collected from the user is selected from the group consisting of contact information of the user, contact information for an entity that the user represents, or one or more notes relating to a purpose of information collection from the user.

24. The system of claim 16, wherein the one or more data collection mechanisms are selected from the group consisting of an interactive voice response system, an interactive web-based system, or a live-agent based system.

25. The system of claim 16, wherein the portion of the script further comprises one or more queries for information to the user.

26. The system of claim 16, wherein the one or more records operate to form a contact management database for the second entity.

27. The system of claim 16, wherein the first entity comprises a call center that operates to collect information for the second entity using the one or more data collection mechanisms.

28. A method for providing information collection from a user at a data collection mechanism, the method comprising:
collecting at least a portion of information from a user of a communication system on behalf of a first entity using a data collection mechanism operated by a second entity, wherein the first entity comprises an entity that is different than the second entity, and wherein using the data collection mechanism comprises using a script having one or more dynamic links in the script to automatically initiate the performance of one or more functions during the collection of information from the user, wherein the performance of the one or more functions comprises accessing an application or information source to automatically populate one or more open fields in the script when at least one other field of the script is populated with a portion of the information collected from the user; and
storing one or more records in a memory on behalf of the first entity, each of the one or more records comprising information associated with a client of the first entity and at least one of the records comprising at least a portion of the information collected from the user of the communication system, wherein the one or more records are controlled by the second entity, wherein the second entity operates to export the one or more records to the first entity by communicating the one or more records through a network.

29. The method of claim 28, wherein the portion of information collected from the user is selected from the group consisting of contact information of the user, contact information for an entity that the user represents, and one or more notes relating to a purpose of information collection from the user.

30. The method of claim 28, wherein the one or more records operate to form a contact management database for the first entity.

31. The method of claim 28, wherein the one or more records comprise at least a first record that includes the contact information for the user of the communication system and at least a second record that includes the contact information for a client of the first entity that the user represents.

32. The method of claim 31, wherein the first record is a sub-record of the second record.

33. The method of claim 28, wherein the second entity provides access to the one or more records to the first entity through a network.

34. The method of claim 28, further comprising:
storing a plurality records including information collected from a plurality of users of the communication system in a plurality of memory modules, each of the plurality of memory modules comprising a contact management database associated with a selected one of a plurality of entities, each contact management database comprising a plurality of records associated with associated customers of a particular entity.

35. The method of claim 34, further comprising:
allowing a plurality of employees of the particular entity to access a particular contact management database associated with the particular entity.

36. A method for providing information collection from a user at a data collection mechanism, the method comprising:
collecting information from a plurality of users of a communication system on behalf of a first entity using one or more data collection mechanisms operated by a second entity, and wherein using the one or more data collection mechanisms comprises using at least one script having one or more dynamic links in the script to automatically initiate the performance of one or more functions during the collection of information from the user, wherein the performance of the one or more functions comprises accessing an application or information source to automatically populate one or more open fields in the script when at least one other field of the script is populated with a portion of the information collected from the user, and storing at least a portion of the information collected from each of the plurality of users in a contact management database on behalf of the first entity, wherein the contact management database is stored in a memory and is controlled by the second entity and wherein the contact management database is electronically searchable, wherein the second entity operates to export the contact management database to the first entity by communicating the one or more records through a network.

37. The method of claim 36, wherein the contact management database comprises information associated with one or more clients of the first entity.

38. The method of claim 36, wherein the second entity provides access to the contact management database to the first entity through a network.

39. The method of claim 36, further comprising:
collecting information from a plurality of users of a communication system on behalf of a plurality of entities; and storing a plurality of records including information collected from a plurality of users of the communication system in a plurality of memory modules, each of the plurality of memory modules comprising a contact management database associated with a selected one of the plurality of entities, each contact management database comprising a plurality of records associated with associated customers of a particular entity.

40. The method of claim 39, further comprising:
allowing a plurality of employees of the particular entity to access a particular contact management database associated with the particular entity.

* * * * *

UNITED STATES PATENT AND TRADEMARK OFFICE
CERTIFICATE OF CORRECTION

PATENT NO.       : 7,593,962 B2                                    Page 1 of 1
APPLICATION NO.  : 11/062229
DATED            : September 22, 2009
INVENTOR(S)      : Beale et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this

Fourteenth Day of December, 2010

David J. Kappos
*Director of the United States Patent and Trademark Office*